(12) United States Patent
Junige et al.

(10) Patent No.: US 8,657,381 B2
(45) Date of Patent: Feb. 25, 2014

(54) ADJUSTMENT KINEMATICS FOR AN ARM REST

(75) Inventors: Bert Junige, Gifhorn (DE); Burkhard Gis, Rühen (DE)

(73) Assignee: Volkswagen AG, Wolfsburg (DE)

( * ) Notice: Subject to any disclaimer, the term of this patent is extended or adjusted under 35 U.S.C. 154(b) by 58 days.

(21) Appl. No.: 13/057,268

(22) PCT Filed: Jul. 14, 2009

(86) PCT No.: PCT/EP2009/005091
§ 371 (c)(1),
(2), (4) Date: Feb. 2, 2011

(87) PCT Pub. No.: WO2010/015312
PCT Pub. Date: Feb. 11, 2010

(65) Prior Publication Data
US 2011/0133536 A1    Jun. 9, 2011

(30) Foreign Application Priority Data
Aug. 2, 2008   (DE) .......................... 10 2008 036 227

(51) Int. Cl.
*B60N 2/46*      (2006.01)
*A47C 16/00*    (2006.01)

(52) U.S. Cl.
USPC ................................ 297/411.32; 297/411.37

(58) Field of Classification Search
USPC ............... 297/411.3, 411.32, 411.35, 411.38, 297/411.39, 411.37
See application file for complete search history.

(56) References Cited

U.S. PATENT DOCUMENTS

| | | | |
|---|---|---|---|
| 5,524,958 A * | 6/1996 | Wieczorek et al. | 297/188.17 |
| 5,732,994 A | 3/1998 | Stancu et al. | |
| 5,845,539 A | 12/1998 | Huang | |
| 5,853,220 A * | 12/1998 | Gulich et al. | 297/188.16 |
| 5,984,416 A * | 11/1999 | Waldo et al. | 297/411.38 |
| 7,077,468 B2 * | 7/2006 | Maierholzner | 297/188.19 |
| 7,104,609 B2 * | 9/2006 | Kim | 297/411.35 |
| 8,104,837 B2 * | 1/2012 | Diffrient | 297/411.31 |
| 2002/0089217 A1 | 7/2002 | Scheerhorn | |
| 2006/0279123 A1 * | 12/2006 | Bazinski et al. | 297/411.35 |

FOREIGN PATENT DOCUMENTS

| | | |
|---|---|---|
| DE | 716697 A | 1/1942 |
| DE | 19504301 A | 8/1995 |
| DE | 19542198 Y | 5/1997 |
| DE | 19615743 Y | 9/1997 |
| DE | 19915469 A | 10/2000 |

(Continued)

*Primary Examiner* — David R Dunn
*Assistant Examiner* — Timothy J Brindley
(74) *Attorney, Agent, or Firm* — Lucas & Mercanti, LLP; Klaus P. Stoffel

(57) ABSTRACT

The invention relates to an arm rest, particularly for a center console of a motor vehicle, comprising a carrier element (1) having a support element (11) moveably arranged on the carrier element (1), wherein the carrier element (1) and the support element (11) can be pivoted about a first pivoting axis (y) by means (3, 5, 7A, 7B or 3, 7A, 8) arranged in or on the carrier element (1). The support element (11) can be displaced with respect to the carrier element (1) by a connection to one of the arranged means (3, 5, 7A, 7B or 3, 7A, 8). According to the invention, pivoting of the carrier element (1) together with the support element (11) and displacing the support element (11) with respect to the carrier element (1) can be released or blocked by actuating a single control element (6) that acts upon the arranged means (3, 5, 7A, 7B or 3, 7A, 8).

9 Claims, 2 Drawing Sheets

(56) References Cited

FOREIGN PATENT DOCUMENTS

| DE | 20205029 A | 8/2002 |
|----|------------|--------|
| DE | 10126536 Y | 12/2002 |
| DE | 102004062942 | 2/2006 |
| DE | 202006012228 A | 10/2006 |
| DE | 102006023038 | 11/2007 |

* cited by examiner

ADJUSTMENT KINEMATICS FOR AN ARM REST

The present application is a 371 of International application PCT/EP2009/005091 filed Jul. 14, 2009, which claims priority of DE 10 2008 036 227.1, filed Aug. 2, 2008, the priority of these applications is hereby claimed and these applications are incorporated herein by reference.

BACKGROUND OF THE INVENTION

The invention relates to an armrest.

The utility model DE 202 05 029 U1 describes an armrest with moveable arm support. This armrest includes an adjusting mechanism for the linear movement of the arm support. The armrest consists of an arm support and a basic carrier which is connected to the armrest holder which consists of the two holding arms. The armrest can additionally be installed between the front seats of an automobile in the area of the center console so as to be pivotable. The holding arms are supported for this purpose on a shaft so as to be pivotable. At the bottom side of the armrest are provided in the front and rear areas two inwardly facing bearing points each for receiving guide rods. The bearing points are integrally formed on the arm support and form together with the arm support a structural component. The two symmetrically arranged guide rods which are spaced apart parallel to each other are fastened in the bearing points facing in the pulling-out direction to the arm support and are guided in linear guides which are provided at the basic carrier. As a result, the arm support can be displaced in the predetermined adjusting range in longitudinal direction. At the inner side of the basic carrier, which has a dish-shaped contour, the locking element and a braking element are fastened which are composed of a sleeve-shaped structural component with an integrated compression spring and a steel or plastic ball and which have the purpose of preventing an undesired linear movement of the armrest.

The utility model DE 20 2006 012 228 U1 also describes an armrest-like console device with an arm support and with a carrier on which is arranged the arm support so as to be pivotable about an axis of rotation arranged on the carrier. The axis of rotation of the arm support is slideable relative to the carrier from a basic position into an operating position and the arm support has at one end assigned to the axis of rotation a protection device which extends opposite the arm support. The protection device covers an area released by the arm support by a displacement movement of the arm support from the basic position into the operating position.

The patent DE 199 15 469 B4 discloses an armrest for a middle console of an automobile with a basic device which is pivotable with the armrest about a first axis of rotation which is fixedly connected to the console. The basic arrangement includes a toothed segment so that within a certain angle range several positions of inclination of the armrest are adjustable, wherein the toothed segment comes close to the first axis of rotation which is fixedly connected to the console. In the respective armrest position, a ratchet member which is pivotable about a second axis of rotation rigidly connected to the console, engages supported by a spring in the toothed segment.

Usually actuating elements are arranged which must be actuated for releasing the respective movement, pivoting or displacement, so that a respective release takes place and the operator can adjust the desired position.

SUMMARY OF THE INVENTION

The operating and logic concepts are partially constructed in such a complex manner that the customer is overwhelmed because for effecting the desired movements of the arm rest different actuating manipulations have to be carried out which are difficult to understand for the customer.

Consequently, the invention is based on the object to provide simple kinematics and an operating possibility for an armrest, particularly a center armrest, which is simple to understand by the user.

The invention starts from an armrest, particularly for a middle console, of an automobile which includes a carrier element with a support element arranged on the carrier element, wherein the carrier element and the support element are pivotable together about a first axis of rotation y by means arranged in or on the carrier element, and wherein the support element is displaceable relative to the carrier element by a connection with at least one of the arranged means.

In accordance with the invention, pivoting of the carrier element together with the support element about the first axis of rotation y and displacement of the support element relative to the carrier element are releasable or lockable by actuating a single operating element, which acts on means in or on the carrier element.

The operating element is preferably arranged at the front side of the support element which is displaceable relative to the carrier element.

In a first preferred embodiment, the carrier element includes a guide, particularly a guide rod, which is arranged in or on the carrier element, wherein a first braking element is arranged as a means of the carrier element for releasing or locking the displacement of the support element relative to the carrier element—on and/or at and/or in—of the guide connected to the support element, on the one hand, which, on the other hand, is connected in a frictional and/or positively locking manner with the guide, particularly the guide rod. The support element is preferably constructed in such a way that it has at least one means which facilitates along the guide rod a directional linear guidance of the support element relative to the carrier element.

For pivoting the armrest relative to the console, particularly a middle console, the carrier element is pivotable on an axis/shaft with the automobile, particularly with an understructure, for example, the middle console and/or a rest.

In accordance with the first embodiment, if in or on the carrier element is only provided on one side the braking element connected to the support element, a latch or the like is arranged as a means for releasing or locking a joint pivoting of the carrier and support elements, wherein the latch engages in a receiving means of a console of the armrest, wherein the latch is connected to the operating element.

Consequently, in accordance with the first embodiment, there is the possibility of effecting a release or locking of the latch relative to the receiving means of the console by actuating the operating element, so that the armrest, the carrier element and the support element can be pivoted together in their totality on the y-axis about the y-axis/shaft.

Simultaneously with the actuation, the support element is released for displacement relative to the carrier element, because the operating element acts on the first braking element and releases the support element and once again locks the support element as needed.

The operation will be explained further with the aid of FIG. 1 in a detailed description of the first embodiment.

In a second preferred embodiment, the carrier element for pivoting the armrest relative to the console, particularly the middle console, is also pivotable on an axis/shaft with the automobile, particularly connected with an understructure of a middle console and/or a rest.

As in the first embodiment, the carrier element has a guide, particularly a guide rod, which is arranged in the interior of the carrier element, wherein on and/or at and/or in the guide also is arranged a first braking element which is connected in a frictionally engaging and/or positively engaging manner with the guide rod. This first braking element is once again connected to the support element, on the one hand, and on the other hand, in a frictional and/or positively engaging manner with the guide. The support element is also constructed in the second preferred embodiment in such a way that it includes at least one means for facilitating along the guide rod a linearly directed guidance of the support element relative to the carrier element.

In this second embodiment, in contrast to the first embodiment, a second braking element which is on one hand connected to the carrier element is arranged on or in the axis/shaft, wherein the braking element is connected on the other hand in a frictionally and/or positively engaging manner with the axis/shaft.

The first braking element and the second braking element which is present according to the second embodiment in contrast to the first embodiment, are connected through a connecting element each or also to each other through connecting elements which are in connection with each other with the operating element arranged in the support element, wherein the connecting element or the connecting elements between the support element and the carrier element is/are arranged moveably in the interior of the armrest preferably on the carrier element, so that a stroke of the connecting element or the connecting elements caused by the operating element releases or locks the frictionally engaging and/or positively engaging connection between the first braking element and/or the second braking element, depending on the stroke length and the direction of movement of the stroke. The operation resulting from this configuration will be explained in more detail in a detailed description of the second embodiment with the aid of FIG. 2.

BRIEF DESCRIPTION OF THE DRAWING

The invention will in following be explained in more detail in the two embodiments with the aid of FIG. 1 and FIG. 2 of the drawing.

DETAILED DESCRIPTION OF THE INVENTION

Figure 1:
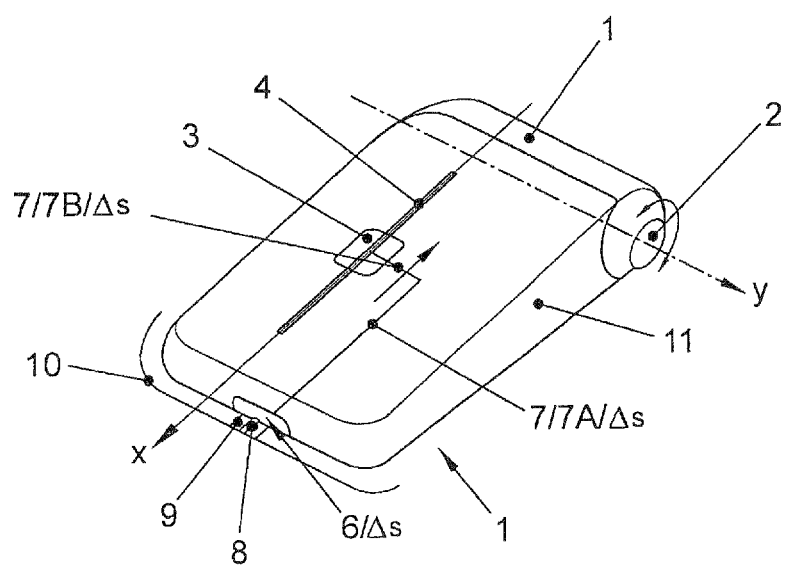
Figure 2:
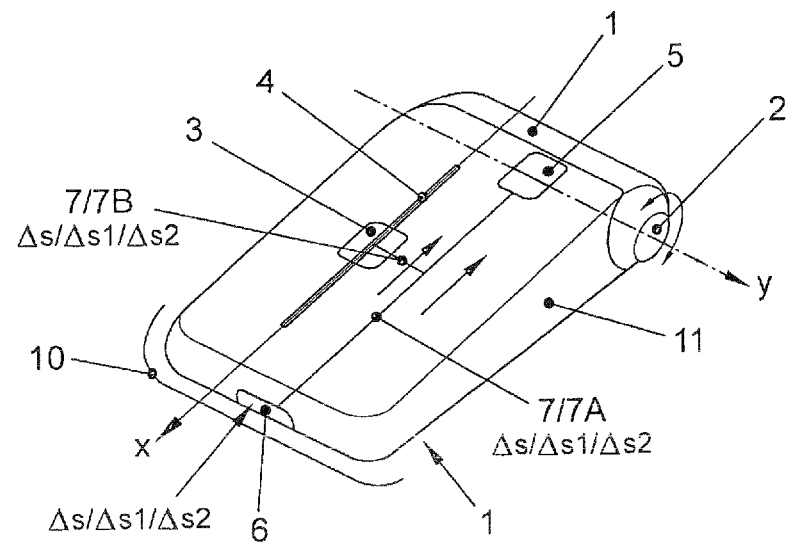
Figure 2A:
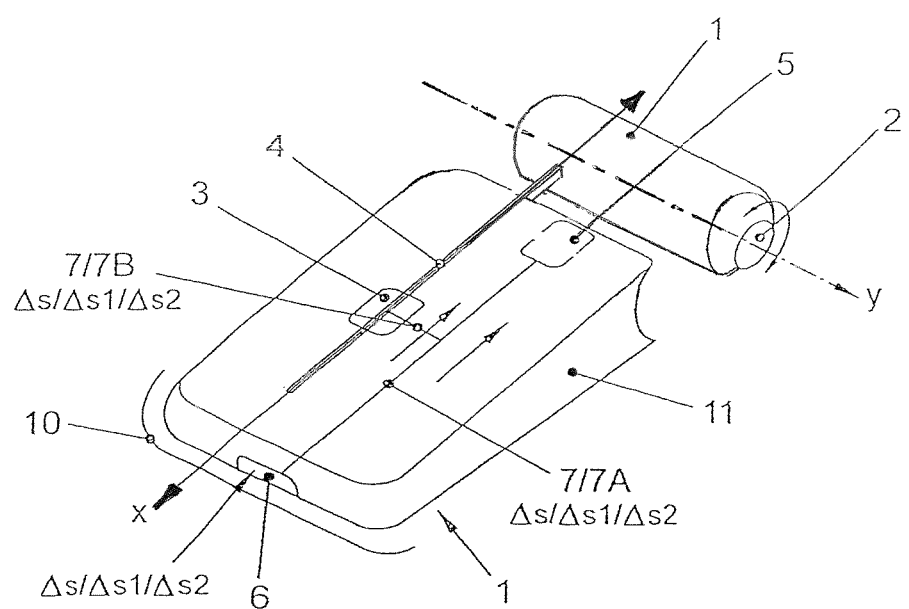

FIG. 1 shows the first embodiment and FIG. 2 the second embodiment. FIG. 2A schematically shows a second position of the second embodiment with the support element displaced from the carrier element.

The carrier element 1 illustrated in FIG. 1 is supported with a support element 11 arranged on the carrier element 1 of an armrest is rotatably/pivotally mounted on a y-axis or a shaft 2 extending in the y-direction. The support element 11 has, for example, a cushion, not illustrated, and, for example, a lining. The carrier element 1 serving as the basic element is only visible in the rear part containing the axis or shaft 2. In the part further toward the front the carrier element 1 is invisible in this depicted illustration of the support element 11 which is a perspective illustration obliquely from the top. The carrier element 1 is rigidly connected to the automobile body through the axis/shaft 2, but moveably preferably on the body of the vehicle or on the understructure of a rest (not illustrated), and/or a console 10 of the armrest (not shown).

The corresponding console 10 of the armrest is, for example, a middle console 10, arranged underneath the armrest, wherein only small portions of the console 10 are seen in the front area of FIGS. 1 and 2.

In FIG. 1, illustrated in or on the carrier element of the armrest is a linear guide 4, particularly a guide rod, for the displacement of the support element 11 in the x-direction, for example, a direction of travel—in the non-pivoted position of the armrest.

On the axis/shaft 2 of the carrier element 1 of the armrest constructed, for example, in the y-direction, in the first embodiment no means for releasing or locking the pivoting of the armrest is provided.

As compensation, in the console of the armrest a latch 8 is arranged which engages in receiving means 9 of the console 10 and locks or releases the armrest relative to the console 10. This latch 8 is addressed by the operating element 6 constructed, for example, as a button, by transmitting a stroke Δs of the operating element 6 through a kinematic system, not illustrated, and/or a Bowden cable to the latch.

The operating element 6 is additionally connected to the first braking element 3 through a connecting element 7, 7A, 7B. By actuating the button 6, which transmits the actuating movement or stroke Δs of the button 6 through the connecting elements 7, 7A, 7B to the guide of the first braking element 3, the support element 11 is displaceable relative to the carrier element 1 by loosening the first braking element 3. In the non-pivoted armrest, the displacement of the support element 11 takes place in the x-direction relative to the carrier element 1.

In the first embodiment, the release of the first braking element 3 on the guide 4 releases the support element 11. When the operating element 6 is actuated, simultaneously the latch 8 is unlocked from the console 10 of the receiving means 9 of the console 10.

The linear longitudinal displacement of the support element 11 relative to the carrier element through the guide 4 is now possible by releasing the first braking element 3. Simultaneously, the pivoting movement of the armrest is possible independently of the position of the support element 11 due to the unlocked carrier element 1 which is freely pivotable about the axis/shaft 2 with the support element 11 being mounted on the carrier element 1.

For example, if the operating element 6 is no longer actuated in view of the non-pivoted armrest in the forwardly displaced position of the element 11 in the x-direction, the first braking element 3 secures the support element 11 on the guide 4 of the carrier element 1 in the pre-determinable position along the travel direction in the x-direction. In that case, in this position simultaneously again locking of the carrier element 1 by the latch 8 relative to the receiving means 9 of the middle console 10 takes place.

Consequently, after actuating a single operating element 6, a displacement of the support element relative to the support element 1 or, respectively, a common pivoting support element 11 are basically possible.

In FIG. 1, the connecting element arranged between operating element 6 and first braking element 3 composed of a connecting element 7A in x-direction and a connecting element 7B in y-direction, so that the connecting element 7B extending in the y-direction extends orthogonally from the connecting element 7A extending in the x-direction. This embodiment corresponds to the second embodiment of FIG. 2 because, in that embodiment, two braking elements 3, 5 are addressed through a connecting arrangement 7, 7A, 7B, and the connecting element 7A is extended in a straight extension to the braking element 5.

In the first embodiment, the guide 4 can also be arranged with the first braking element 3 in a straight extension of the operating element 6, so that a simple arrangement of a connecting element 7 without an orthogonal branch is feasible. The illustrated the arrangement of the connecting elements 7, 7A, 7B, is also preferably feasible for the first embodiment if a structural space with an upwardly space-saving configuration with a lateral access to the first braking element 3 should be realized.

FIG. 2 shows the second embodiment. A carrier element 1 and support element 11 constructed, illustrated and described in FIG. 1, as an armrest is pivotably/rotatably mounted pivotably on an axis or a shaft 2.

On the axis/shaft 2 of the carrier element 1 of the armrest, for example, in the y-direction a means for releasing or locking the pivoting of the armrest about the y-axis is provided in contrast to the first embodiment of FIG. 1. In this case, the releasable or lockable means for pivoting the armrest is not a latch 8 as described in connection with the first embodiment, but a second braking element 5 arranged on and/or at and/or in the axis/shaft 2 and, on the one hand, connected to the carrier element 1 and, on the other hand, connected in a frictionally engaging and/or positively engaging manner to the axis/shaft 2.

As is the case in the first embodiment, a linear guide 4 for the displacement of the support element 11 relative to the carrier element 1 is provided. In or on the guide 4 is provided a first braking element 3 connected, on the one hand, to the support element 11 and, on the other hand, to the braking element 3, wherein the braking element 3 is also in frictionally engaging and/or positively engaging manner connected to the guide 4.

An operating element 6, for example a button or the like, is connected in the second embodiment connected again to both braking elements 3, 5 through the connecting elements 7, 7A, 7B.

By actuating the button 6, which simultaneously or successively transmits the actuating movement, i.e. stroke Δs, of the button 6 over the connecting elements 7, 7A, 7B to the two braking elements 3, 5, both braking elements 3, 5 are simultaneously or successively released and the support element 11 can simultaneously or not simultaneously be displaced with the pivoting of the armrest relative to the carrier element 1, wherein in various embodiments, in the case of a step-by-step release or tightening of the braking elements 3, 5 relative to the guide 4, the displacement of the support element 11 relative to the carrier element 1 and/or the pivoting of the armrest take place step-by-step, i.e., successively.

In such a step-by-step operation of the armrest, in a first further development of the second embodiment, the braking effect of the braking element 3, 5 can be dimensioned in such a way that, depending on the strength of the actuating movement, i.e. depending on the stroke Δs of the button 6, either the first or second braking element 3, 5 can first be released as a result of a first stroke length Δs1, so that initially a pivoting about the y-pivoting axis and only thereafter, after a further actuation of the button 6 and an effected second further stroke length Δs2, a displacement of the support element 11 relative to the carrier element of the armrest or vice-versa can be effected.

A dimensioning of the actuation can in a second further development of the second embodiment take place also in such a way that through a stroke Δs of the same length simultaneously the release or loosening of both braking elements 3, 5 is effected, so that simultaneously the displacement of the support element 11 relative to the carrier element 1 and the pivoting of the armrest in its entirety about the y-pivoting axis is facilitated.

When actuating the button 6, the connecting element 7, 7A, 7B is displaced depending on the first or second embodiment of the invention in the respective length Δs/Δs1/Δs2, wherein the connecting element 7 is constructed in such a way that a part of the connecting element 7A leading to the second braking element 5 is arranged in a straight extension to the operating element 6 as a leading part of the connecting element 7A, and a part of the connecting element 7B leading to the first braking element 3, branches off from the first part of the connecting element 7A in an essentially orthogonal, space-saving manner on a horizontal plane. Used as the connecting element 7, 7A, 7B can be a linkage and/or Bowden cable or the like. The direction of movement of the connecting elements 7, 7A, 7B, caused by the actuation of the operating element 6, is indicated by the directional arrows appearing in the figures.

Releasing the button 6, i.e. a movement against the directional arrows indicated in the Figure has, the effect that both braking element 3, 5, depending on the first or second development of the second embodiment of the invention are either successively or simultaneously again connected or positively locked with the guide 4 or the axis/shaft 2 in a frictionally and/or positively engaging manner.

In this connection, it is possible for the operator to adjust aside from the end position also all intermediate positions along the guide 4 and along the circumference of the axis/shaft 2 according to the desired adjusted action, i.e., pivoting of the entire armrest and/or displacement of the support element 11 relative to the carrier element 1 depending on any intermediate release of the operating element 6. The braking elements 3, 5 can also be controlled by connecting elements 7 that depend on the actuating stroke of the operating element 6, but act independently of each other.

The support element 11 is displaceable relative to the carrier element starting from the position illustrated in FIGS. 1 and 2, for example, by a distance Δx in the travel direction x and back, wherein this adjustment is possible in any conceivable inclination between the horizontal 0 degrees and the upwardly vertical arrangement of 90 degrees. It is also conceivable to make the adjustment of inclination through the vertical arrangement of above 90 degrees and starting from the horizontal arrangement so as to be pivotable downwardly.

This solution according to the invention with its embodiments and further developments make it possible for a single operating element 6 to release the desired movements of the armrest. The arrangement of the means 3, 5, 7A, 7B or 3, 7A, 8 result in a simple operating logic by means of which the desired positions can be variably adjusted and locked after a release.

1 carrier element
2 axis/shaft
3 first braking element
4 guide
5 second braking element
6 operating element, (button)
7 connecting element
7A connecting element in x-direction
7B connecting element in y-direction
8 latch
9 receiving means
10 middle console
11 supporting element
Δs stroke
Δs1 first stroke
Δs2 second stroke
x x-direction (x-direction of travel)
y y-axis (y-pivoting axis)

The invention claimed is:

1. An armrest, comprising a carrier element; a support element moveably arranged on the carrier element; an assembly for pivoting the carrier element and the support element about a first axis of rotation, the assembly being arranged in or on the carrier element, the support element being slideable relative to the carrier element by a connection to the assembly; and a single operating element that acts on the assembly is actuatable so that a pivoting of the carrier element together with the support element and displacement of the support element relative to the carrier element are releasable or lockable, wherein the carrier element includes a guide arranged in or on the carrier element, wherein the assembly includes a first braking element for releasing or locking a displacement of the carrier element on or in the guide, the first braking element being connected to the support element and frictionally directly connected or positively directly connected to the guide.

2. The armrest according to claim 1, wherein the guide is a guide rod.

3. The armrest according to claim 1, comprising a console having an understructure and a receiver, wherein the carrier element is pivotably connected to the understructure of the console along an axis/shaft, and further comprising a latch for releasing or locking the carrier element and the support element, the latch engaging the receiver of the console and being connected with the operating element.

4. The armrest according to claim 1, wherein the carrier element is pivotably connected to the motor vehicle on an axis/shaft, wherein a second braking element is arranged on or in the axis shaft for releasing or locking a pivoting action, the a second braking element being connected to the carrier element and in a frictionally engaging and/or positively engaging manner to the axis/shaft.

5. The armrest according to claim 1, wherein the first braking element is connected to the operating element by a connecting element, wherein the connecting element is arranged moveably in or on the carrier element, so that a stroke of the connecting element caused by the operating element releases or locks, depending on a direction of movement of the stroke, the frictional or positive connection between the first braking element and the guide.

6. The armrest according to claim 4, wherein the first and second braking elements are connected with the operating element by a connecting element, wherein the connecting element is movably connected to the carrier element so that a stroke of the connecting element caused by the operating element releases or locks the frictional or positive connection between the first braking element and the guide or between the second braking element and the axis/shaft depending on a direction of movement of the stroke.

7. The armrest according to claim 4, wherein, depending on a length of a stroke of the operating element either the first or the second braking element is released first, so that through the connecting elements first a joint pivoting of the carrier and support elements can be effected with a first pre-determinable stroke length, and only then, after a second further pre-determinable stroke length a displacement of the support element relative to the carrier element or vice-versa can be effected.

8. The armrest according to claim 4, wherein a stroke of the operating element with a pre-determinable length, over the connecting element, simultaneously causes a release or loosening of the braking elements so that simultaneously a displacement of the support element relative to the carrier element and a joint pivoting of the carrier and support elements about a y-pivoting axis is possible.

9. The armrest according to claim 3, wherein the operating element is connected with the latch by a kinematic or Bowden cable.

* * * * *

UNITED STATES PATENT AND TRADEMARK OFFICE
CERTIFICATE OF CORRECTION

PATENT NO. : 8,657,381 B2  Page 1 of 1
APPLICATION NO. : 13/057268
DATED : February 25, 2014
INVENTOR(S) : Junige et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 65 days.

Signed and Sealed this

Twenty-ninth Day of September, 2015

Michelle K. Lee
*Director of the United States Patent and Trademark Office*